(12) United States Patent
Riegl et al.

(10) Patent No.: US 6,989,890 B2
(45) Date of Patent: Jan. 24, 2006

(54) APPARATUS FOR TAKING UP AN OBJECT SPACE

(75) Inventors: Johannes Riegl, Trabenreith (AT); Rainer Reichert, Horn (AT); Andreas Ullrich, Gablitz (AT)

(73) Assignee: Riegel Laser Measurement Systems, GmbH, Horn (AT)

( * ) Notice: Subject to any disclaimer, the term of this patent is extended or adjusted under 35 U.S.C. 154(b) by 421 days.

(21) Appl. No.: 10/287,605

(22) Filed: Nov. 5, 2002

(65) Prior Publication Data

US 2003/0090646 A1 May 15, 2003

(30) Foreign Application Priority Data

Nov. 9, 2001 (AT) .............................. A 1770/2001

(51) Int. Cl.
*G01C 3/08* (2006.01)

(52) U.S. Cl. ................... 356/5.01; 356/5.02; 356/5.04; 356/612

(58) Field of Classification Search ...... 356/5.01–5.15, 356/141.1, 612; 382/154
See application file for complete search history.

(56) References Cited

U.S. PATENT DOCUMENTS 5,528,354 A * 6/1996 Uwira ....................... 356/5.01
5,877,851 A * 3/1999 Stann et al. ................ 356/5.09
2004/0021852 A1 * 2/2004 DeFlumere .............. 356/141.1

FOREIGN PATENT DOCUMENTS

| AT | 409195 | 6/2002 |
| WO | WO99/46614 | 9/1999 |

\* cited by examiner

*Primary Examiner*—Thomas H. Tarcza
*Assistant Examiner*—Isam Alsomiri
(74) *Attorney, Agent, or Firm*—Buchanan Ingersoll PC

(57) ABSTRACT

The present invention is directed to a system and method for taking up an object space using a laser range finder and a scanning device for scanning the object space. Furthermore, there is a passive opto-electronic receiver having an associated scanning device. The scanning device(s) scans the object space for the range finder and the passive receiver synchronously and in phase. To each image element, a spatial angle is assigned for identification. The passive receiver, comprises an array of transducer, elements where the image angle of an individual element of the array corresponds preferably to the beam angle of the laser beam. A memory includes one cell per image element so that with each distance measurement the individual elements of the array can be read and their signals stored in the cells of the memory. With each distance measurement the assignment of the elements of the array to the cells of the memory is shifted by one so that the cell which had received the signals of a certain image element receives them anew and the signals received from different spatial angles add up in the cells during subsequent measurements.

16 Claims, 5 Drawing Sheets

APPARATUS FOR TAKING UP AN OBJECT SPACE

This application derives priority from Austrian patent application No. A 1770/2001, filed Nov. 9, 2001, the contents of which are hereby incorporated by reference in their entirety.

BACKGROUND OF THE INVENTION

1. Field of the Invention

This invention relates to an apparatus for taking up an object space using an opto-electronic range finder, which measures individual distances according to a time-of-flight of signal method. More particularly the invention relates to such an apparatus which comprises a transmitter for transmitting optical transmitter signals in the form of a beam of a predetermined angle of beam along an optical axis, and a first receiver having an optical axis for receiving optical signals reflected from an object situated in the object space after a time-of flight of the transmitter signals and the reflected signals which, thus, have a certain time relationship. The optical signals transmitted and received after reflection will preferably be laser signals.

For determining range values from either the time-of-flight or time relationship (phase relationship), there is an evaluating stage which compares the transmitter signals and the reflected signals.

In addition to the above characteristics, the apparatus comprises a second receiver for receiving electromagnetic radiation to form an image from individual image elements, and a scanning device for deviating the direction of said optical axes of said transmitter means as well as of said first and second receiver means in two directions and by a certain deviation angle per said individual distance measurements so as to ensure that the directions of the optical axes of said first and second receiver means coincide and scan said object space synchronously and in phase. Scanning is preferably done in two directions orthogonal to each other, although the invention is not restricted to that.

When, in this context, a "scanning device" is mentioned, it is possible within the frame of the present invention that this scanning device comprises separate scanners for each of the above mentioned axes or at least two.

2. Background Information

Known devices of this kind produce so-called "distance images" or point clouds of the object space.

A possible visualization of the data, thus obtained, is given by using so-called mock colors wherein defined colors are assigned to certain distance ranges. In spite of such measures, interpreting such images is often quite difficult. This applies, in particular, to taking buildings, because their many surfaces can be intensively structured; since, however, these structures will either not protrude from the surface or protrude only by a small amount, they can not, or can hardly, be recognized in the "distance image". This is particularly disturbing, if one wants to generate a 3-D computer model of the object from a plurality of individual images, because the data will not contain sufficient information about the structure of the surfaces.

Similar problems will arise, when such an apparatus provided with a scanner should be used for surveying a place after a traffic accident: while, in general, the vehicles involved, the roadside borders as well as the position of traffic signals can be reproduced very well, it is not possible to show wheel traces or marks on the road used to determine the position at crash of the vehicles involved or of victims of the accident. However, such traces and marks are of essential importance for documenting the way the accident happened.

In order to solve these problems, it has already been suggested, when scanning a scene with the range finder, to scan it synchronously and in phase with an opto-electronic receiver for electromagnetic radiation. In the U.S. Pat. No. 5,528,354, a laser beam was directed to the object and the reflected light was directed both to a range finder portion and an image forming portion. However, just in the narrow wave range of laser light, various items and characteristics remain invisible so that the center of the problem has only been shifted.

It has also been suggested to use, apart from the actively illuminated range finder channel, a purely passive channel, particularly using visible light. In this case, an optical system has been pre-posed to the receiver and adapted the image angle of the receiver approximately to the angle of beam of the transmitter's beam of the range finder. From the corresponding signals, thus obtained, image elements are determined, each image element having a spatial angle assigned (see WO 99/46 614). The above-mentioned receiver may be a color receiver, a monochromatic receiver (black and white) or an infrared receiver. The result when taking up a scene is the above-mentioned "distance images" or very realistic 3-D computer models which show all details and designs on the various surfaces so that an interpretation of these images is relatively simple and additional surveying work, e.g. when documenting a traffic accident, can be avoided.

When using such systems, difficulties can arise when the object is only insufficiently illuminated, as is normally the case when taking inner rooms of large buildings, e.g. churches, halls or when taking caverns, tunnels or caves. Since the aperture of the optical system is limited for constructive reasons and the time of a complete scanning cycle cannot be prolonged at will, the object space, in critical cases, had to be illuminated with searchlights which, of course, is rather troublesome.

In order to mitigate these difficulties, it has been suggested to scan the object space with a sharply directional light beam or light fan in synchronization with the scanning device (see AT-Patent No. 409 195).

The problem described above is still aggravated as the users of such scanning systems are interested in increasing the resolution in order to be able to display more and more details of a combination of a "distance image" (cloud of measuring points) and a visible image or of a 3-D model. However, the resolution of such systems is limited by the divergence of the transmitted laser beam. The divergence of the transmitted beam of appliances according to the prior art amounts about 3 mrad. Modern lasers, in contrast, enable realizing an angle of beam of about 0.3 mrad, thus providing the basis for high-resolution scanning systems. In systems which, apart from a "distance image" supply also a parallel color image or a black-and-white image by a passive sensor (without illumination by the apparatus), the requirement will result to generate also the latter one with the same resolution. However, a reduction of the image angle of a passive sensor in the known designs is only possible by reduction of the light sensitive area of the sensor which leads to a clear reduction of sensitivity.

SUMMARY OF THE INVENTION

The present invention has an object of finding a basically different approach for solving the above-mentioned problem.

Another object is to improve, preferably drastically, the lens speed of the passive image taking system of the scanning apparatus.

These objects are achieved according to the present invention in that a one-dimensional or two-dimensional array is provided as the second receiver, and that the focal length of the optical system pre-posed to this array is chosen in such a way that the image angle of an individual element (transducer) of the array corresponds substantially to the beam angle of the transmitted beam of the range finder device, and that the array is oriented in correspondence with the two scanning directions of the scanning device.

The deviation angle between two subsequent measurements corresponds preferably to the scale division or spacing of the array, or in other words substantially to one of the transducers of the array of the second receiver.

The apparatus comprises furthermore at least one memory having a plurality of cells which correspond in number at least to the number of the transducers or image elements so that the individual transducers of the array can be read and their received signals can each be stored in a cell of the memory, each assigned to one of the transducers or elements of the image of the object space, substantially simultaneously with each one of the individual distance measurements. Finally, the arrangement of the array and the cells of the memory is such that with each individual distance measurement the assignment of the transducers or elements of the array and the cells of the memory is shifted by one pitch so that the signals received from each respective spatial angle are added up in the individual cells during subsequent measurements.

Additional advantages are obtained if, according to a further characteristic of the invention there is a scanner device common to the second receiver for the electromagnetic radiation, and the transmitter and first receiver of the range finder, and that further an optical beam splitter is provided within the path of rays of the scanner device, the beam splitter directing part of the incident radiation to the second receiver.

As a further embodiment, the scanning device for the range finder comprises at least one prism having a plurality of mirror surfaces arranged around an axis of rotation, and drive means for rotating said prism about said axis of rotation, wherein the prism has preferably at least four mirror surfaces, so that the optical axes of the range finder and the second receiver for electromagnetic radiation are deviated by different prism surfaces, preferably adjacent to each other.

In this embodiment or in systems with two scanners operating in parallel, the optical axes both of the range finder and the passive scanner will have a certain distance to each other. Particularly with objects in the proximity range, there will be a displacement of the two images produced by the two systems, i.e. a so-called parallax. For compensating this parallax between the images of the range finder and those of the receiver for electromagnetic radiation, the assignment of the individual elements of the array (the transducers) and the cells of the memory may be changed in correspondence with the measured and assigned distance or range values.

As an alternative for compensating any parallax between the images of the range finder and those of the receiver for electromagnetic radiation, the assignment of the individual elements of the array (the transducers) and the cells of the memory is changed in the course of finishing the data of the "distance image", a luminance image or a color image. Finishing may be effected either by special electronic stages operating with appropriate algorithms or after the images have been stored, e.g. by an operator.

It is advantageous, if the signals stored in the transducers of one line (in case a two-dimensional array is used) may be shifted into those of the adjacent line to add said signals to those possibly contained in said adjacent line.

BRIEF DESCRIPTION OF THE DRAWINGS

Further details and advantages of the invention will become apparent from the following description of embodiments schematically illustrated in the drawings, in which.

DETAILED DESCRIPTION OF THE DRAWINGS

Figure 1:
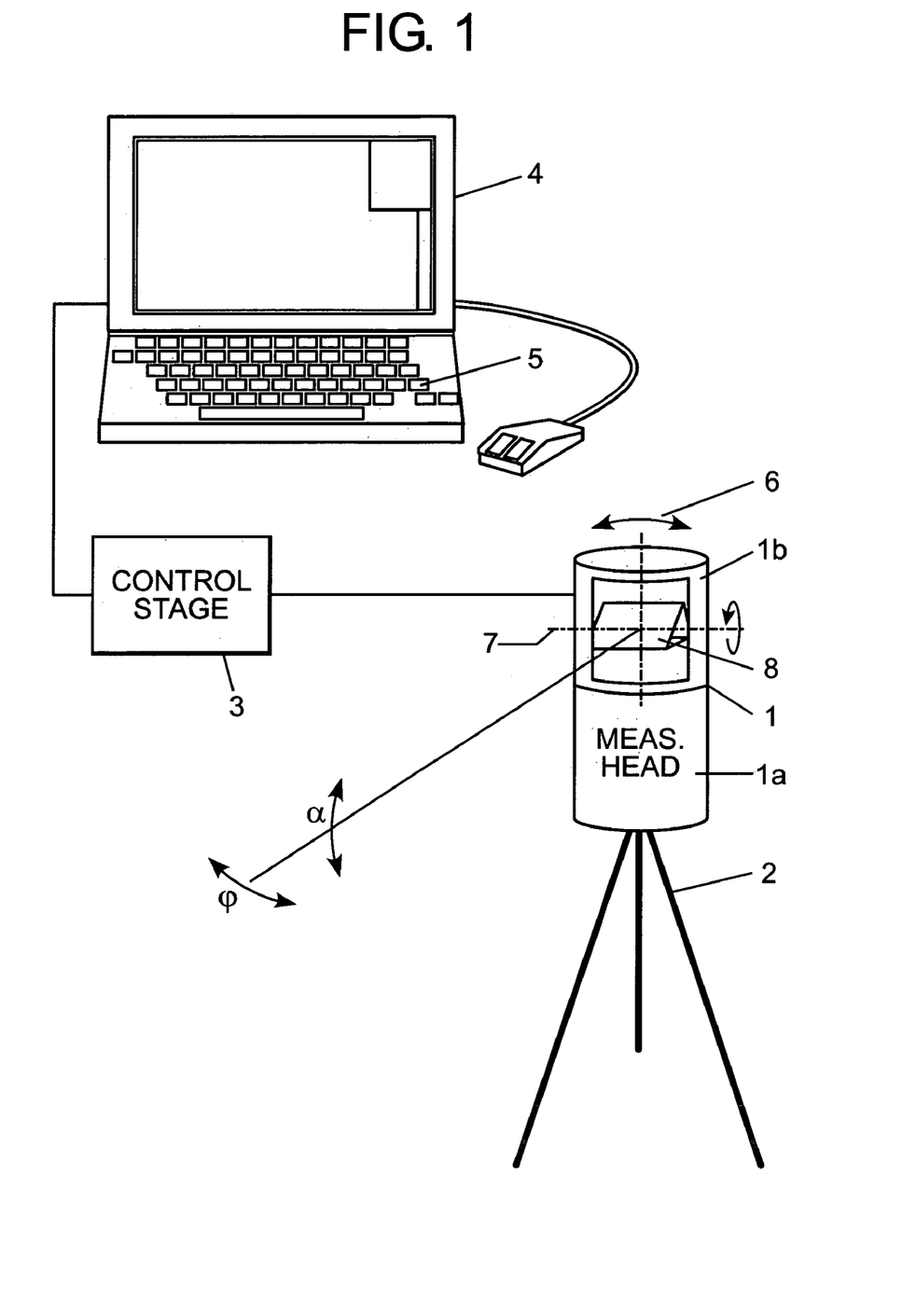
FIG. 1 is a schematic view of an exemplary installation for taking up an object space using an apparatus according to the invention.

FIG. 1 illustrates an installation which makes use of an exemplary apparatus according to the invention. This installation comprises a measuring head 1 located on a tripod 2. This measuring head 1 sends and receives laser signals by means of a transmitter and a first receiver as well as light from the scene (i.e. either natural light or light of a light source arranged externally of the measuring head), as will be explained later. Thus, the measuring head 1 produces signals which are supplied to a control stage 3. This control stage 3 comprises a measuring unit (described later with reference to FIG. 5) for time intervals in order to measure the time-of-flight of light pulses, preferably laser pulses, emitted by a transmitter (comprising a laser 9 in FIG. 2) within the measuring head 1. Preferably, the measuring unit is of the multiple channel type, being thus capable of targeting a plurality of objects, so as to be adapted, in case of receiving several echo pulses, to resolve them over time. Having received an echo pulse, the control stage 3 calculates a corresponding distance or range value from the time-of-flight measured, i.e. the time interval between the moment of transmitting the pulse to the object up to that of receiving the reflected light. Moreover, the control stage 3 comprises a signal processor (discussed in detail below with reference to FIG. 5) which processes the various signals of the measuring head 1 and supplies the result to a monitor 4 of a computer 5 to obtain an image of the object space where each image element has a range or distance value assigned. This, of course, leads practically to a three-dimensional information. This information can be represented on the screen of the monitor 4 as a so-called "distance image" which shows not only the (2-dimensional) image, but also the assigned distance values. The latter can be done, as known per se, using mock colors, i.e. each distance range of a portion of an object has an assigned hue. Optionally, the control unit 3 is integrated into the measuring head 1.

Of course, there are other methods of showing the distance values on the monitor 4; for example, the numerals can show where distances of 5 meters, of 4 meters and so on have been measured. The type of representation can, preferably, be input via the computer 5 which controls the control stage 3 accordingly. The control stage 3, in turn, controls the measuring head 1 which comprises, apart from the above-mentioned transmitter and first receiver as a part of a range finder system, at least one scanning device (discussed below with reference to FIGS. 2 and 4).

The measuring head 1, in this embodiment, has two parts, i.e. a first, stationary lower part 1a firmly attached to the tripod 2, and a rotatable or pivotable upper part 1b. This means that the upper part 1b is rotatably mounted about a vertical axis (see arrow 6 which shows a reciprocating or oscillating movement) on the lower part 1a of the measuring head 1, and is driven to exert this movement by a motor (not shown).

As mentioned above, the measuring head 1 contains at least one scanning device. This scanning device is arranged in the upper part 1b and may include a three-sided mirror prism 8 (FIG. 2) which deviates the transmitter beam and the received beam or optical signals reflected from an object situated in said object space, thus the beams of the range finder system, by an angle α. Thus, it will be understood that this scanning device linearly scans the object space with a vertical fan of about 80°. On the other hand, by pivoting the upper part 1b of the measuring head 1 by an angle φ about a vertical axis, as described above, this scanning fan will scan the whole object space or field to enable to take a complete distance image. To each image element 28' (FIG. 3) which is scanned within the object space and which is defined by the two deviating or scanning angles α and φ, a corresponding distance value derived from the range finder is assigned. In this way, a set of data (image data+distance data) is formed and is stored within a memory as will be explained later with reference to FIG. 5.

Figure 2:
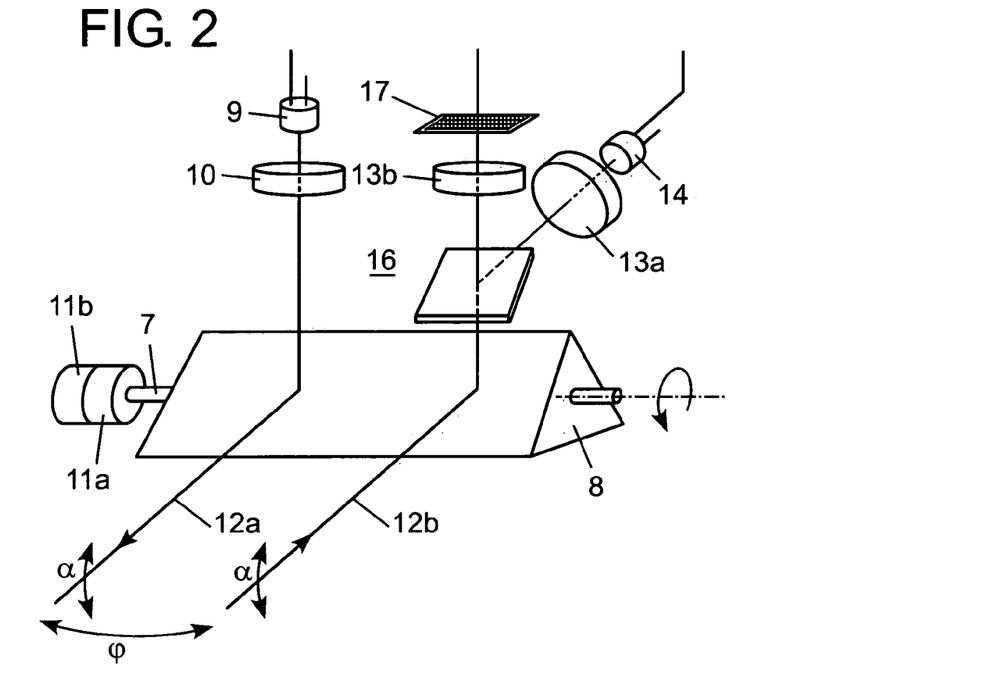
FIG. 2 shows a detail of the apparatus of FIG. 1 according to a first embodiment.

FIG. 2 shows some details contained in the upper part 1b of the measuring head 1. There is a laser 9 of any type, such as a GaAs-laser or a pumped laser, which sends (as an active illuminating system) extremely short IR pulses in the form of a sharply concentrated beam 12a. These pulses are deviated by the rotating mirror prism 8 and scan the object space as a vertical fan. Pre-posed to the laser 9 is a collimating optical system 10 (shown as a single lens). For rotating the prism 8, a motor 11a is provided, while a co-rotating angle decoder 11b gives the respective angle of deviation, i.e. it informs the system and the control in which angular position the mirror prism actually is.

When the beam 12a of the laser 9 having been transmitted into the object space strikes an object, a beam 12b of reflected light will enter the measuring head 1 (FIG. 1) and will be reflected by one of the mirror surfaces of the rotating prism 8 towards a beam splitter or partially transparent mirror 16a. The beam splitter 16a has a dichroic layer, i.e. a selectively reflecting surface which reflects any radiation within the range of the near infrared, but permits visible light to pass through substantially without weakening it. Thus, the major portion of the laser beam of the range finder, if reflected by an object in the object space, will be deviated by the mirror 16a towards an objective lens 13a which concentrates the beam onto a receiver 14. This receiver 14 will preferably be formed by an avalanche diode.

Of course, it is not only the reflected laser beam which enters the measuring head and impinges onto the mirror surfaces of the prism. There will also be a certain proportion of visible light (while the laser's light is mostly in the invisible range). This visible light stems from external light sources, i.e. which are not incorporated into the apparatus. Primarily, this visible proportion will be natural light or day light, but can, in some instances, be the light of a street lamp or a floodlight or the like which is reflected by objects in the object space or is emitted from some objects themselves. It is, however, within the scope of the present invention to use an external source of light which uses light of invisible range of waves, for example an illumination of a wave range outside that of the laser light, which may be recommendable in the case of penetrating fog.

In the present embodiment, the visible portion passes through the mirror 16a substantially without weakening it, and is concentrated by an objective lens 13b onto an array 17 of photo-elements (shown in greater size). This 2-dimensional (i.e. areal rather than linear) array 17 comprises a plurality of photo-elements or transducers (17' in FIG. 3) arranged in a plurality of lines parallel to each other. Preferably the focal length of the objective lens 13b is chosen so that the image angle under which the visible light falls onto these transducers 17' corresponds to the divergence of the laser beam 12a of the active (laser-illuminated) range finder system. In the present embodiment, the angle of beam of the laser beam 12a is about 0.3 mrad, as corresponds to modern laser devices. The array 17 has 128×128 pixels (transducers 17'), an individual photo-element having a size of about 8µ.

In this embodiment, the array 17 used is only sensitive to luminance of the incoming visible light. Alternatively a set of (or even a single) chrominance sensitive arrays can be used, as is usual in color video techniques. This means that either a yellow sensitive transducer and a blue or magenta sensitive transducer alternate on a single array element (being made sensitive for different colors either by selecting transducers which are selective as to colors by themselves or, for example, by a pre-posed strip filter so that three transducers 17' on the array 17 correspond to one pixel) or one array for each of these colors is used (onto which the beam is directed by appropriate beam splitters as is known in video techniques). In this case, a different color filter will be arranged before each one of these arrays. Other systems which use the, intensity, hue and saturation (IHS system) rather than a red-yellow-blue system (so-called RGB system that is used by way of example according to FIG. 6) or any other system can also be employed.

Figure 4:
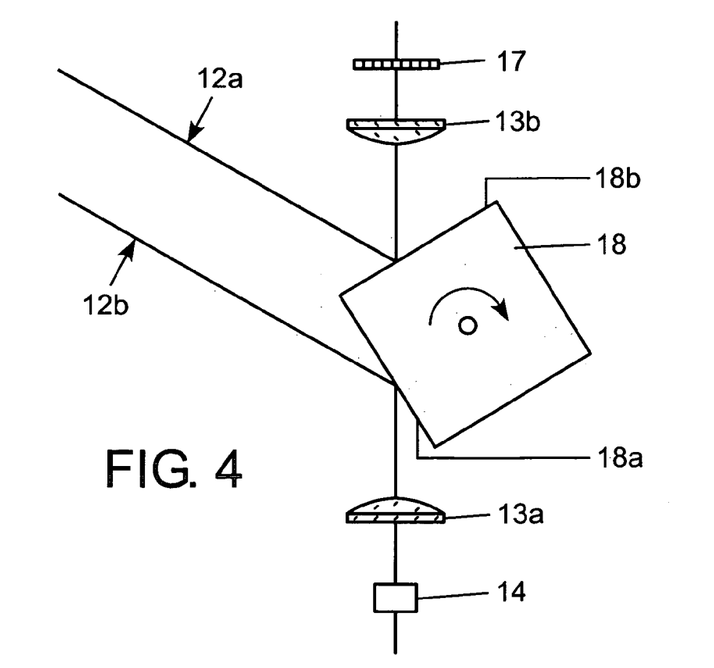
FIG. 4 shows a detail of the apparatus of FIG. 1 according to a second embodiment.

From FIGS. 2 and 4 it may be seen that visible light from the object space takes the same path as the reflected pulse signals of the laser, i.e. impinges the same area of the mirror prism. This is the reason why the beam splitter 16 is used. However, it would be possible to have a separate path of rays for the different beams, i.e. one prism for each one of the different wave lengths (or the same prism having different mirror areas used for the incoming visible and invisible light, as it is the case with the different mirror areas which reflect the beams 12a and 12b) and/or for the transmitted beam 12a and the received beam(s) 12b; but in such a case, synchronization of the different prism drives (corresponding to motor 11a) would be used and, therefore, is not preferred. On the other hand, a beam splitter 16 would, in this latter case, not be necessary.

The image angle of the receiver diode 14 of the range finder system can be significantly broader than the angle of beam of the laser beam 12a. Since the diode 14 is only sensitive for the infrared range of wave lengths and since only short pulses are taken for evaluation (since, in this embodiment, the laser 9 transmits pulse light), the image angle of the diode 14 does not affect the measuring angle of the range finder system. Therefore, the use of pulses (counting the time-of-flight) is preferred. However, the present invention is not restricted to the use of pulsed lasers. The time-of-flight with a continuous-wave laser may be determined also by determining the phase shift between the transmitted beam and the reflected beam received. In this sense, the term of "time-of-flight" should be understood in the broadest sense.

Figure 3:
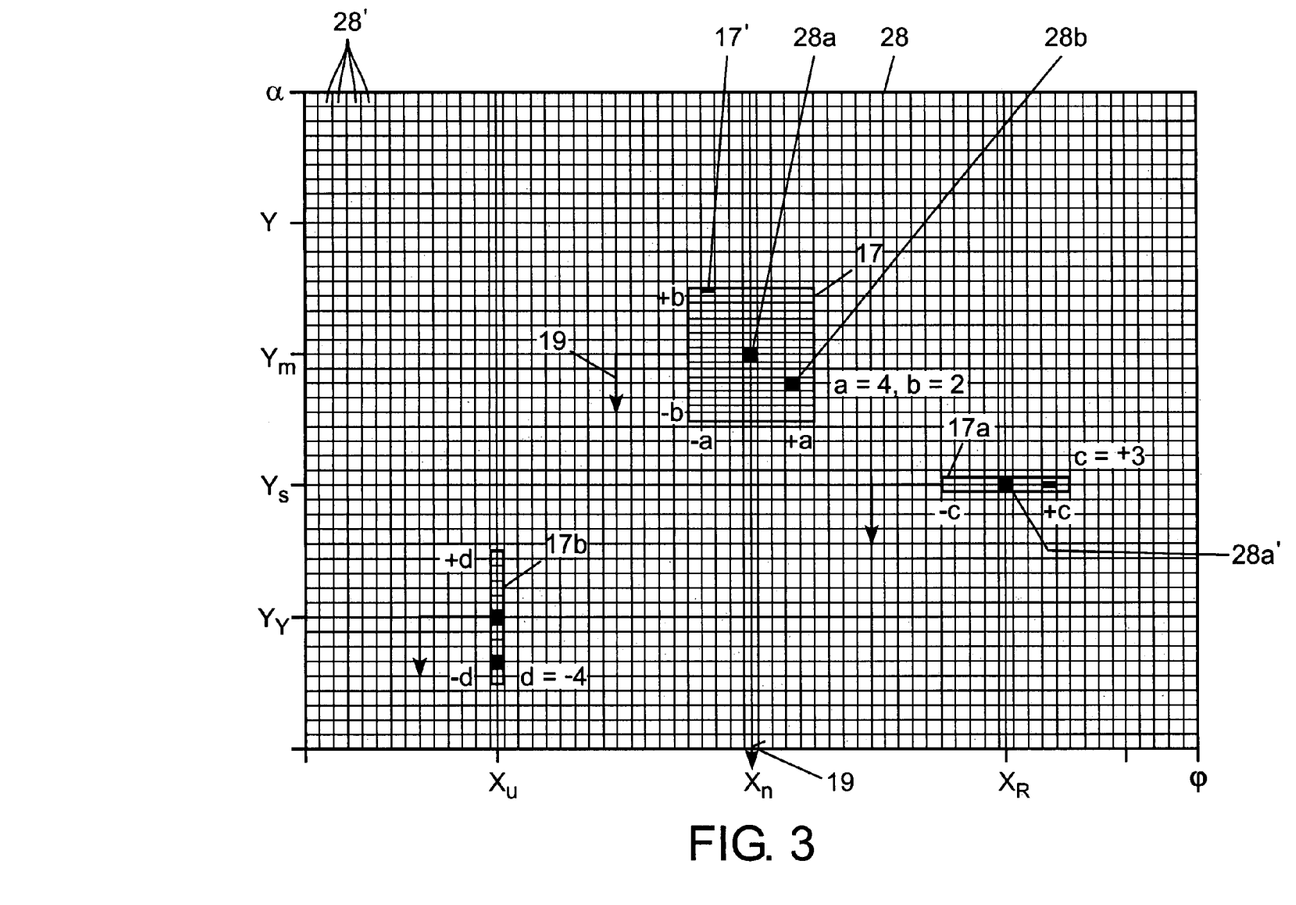
FIG. 3 represents individual image elements within the image frame of an entire object space, portions of which can be taken by a variety of arrays indicated therein.

For scanning the object space in a horizontal direction, the upper part 1b of the measuring head 1, as mentioned above, is pivoted with respect to the stationary lower part 1a of the measuring head 1 by a drive motor (not shown), suitably arranged in the lower part 1b, about a vertical axis (see arrow 6 in FIG. 1) which corresponds to angle $\phi$ in FIGS. 2 and 3. To determine the magnitude of this angle $\phi$, an angle decoder, not shown but similar in function as the angle decoder 11b, is provided which may either be connected to the control stage 3 and/or to the computer 5 (since the control stage 3 will in many cases be incorporated into the computer 5, it is not important which one of the two receives the signal of the decoders for the angles $\alpha$ and $\phi$) in order to inform the respective control stage about the actual horizontal scanning angle $\phi$. The decoder 11b (which in some cases can be integral with the motor 11a), in turn gives information to the respective control about the magnitude of angle $\alpha$. Thus, by having the information on both the angles $\alpha$ and $\phi$, the coordinates and/or image elements (28' in FIG. 3) will be defined.

Principles of the apparatus according to the invention will now be explained with reference to FIG. 3. When scanning the object space both about a vertical axis (upper part 1b of measuring head 1) to obtain the angle $\phi$ and by the rotating prism 8 about a horizontal axis to obtain the angle $\alpha$, the whole possible image field 28 of the object space will be obtained and can be sub-divided into individual image elements 28' which correspond to distinct magnitudes of the angles $\alpha$ and $\phi$. It will be understood by those skilled in the art that other scanning means could be used instead of prisms. For example, it is known to use tilting mirrors to obtain a video image. Likewise, for obtaining image information by the incoming visible light, it would be possible to use an electronic scanning device, as is used in video sets. In the latter case, it is probable that one has one scanning device for the range finder (laser beam 12a) and an electronic one for imaging, and in such a case both scanning devices have to be synchronized, as mentioned above.

As shown in FIG. 3, the image or the image field 28 of the object space includes a plurality of individual image elements 28' (as discussed above) which, in video technique, are usually called "pixels". In the image field 28, the 2-dimensional array 17 is indicated which, through the movement of the prism 8 (FIG. 2), scans the image field 28 in a vertical direction (arrows 19). As soon as a vertical strip of image elements 28' has been scanned, the upper part 1b of the measuring head 1 rotates by the width of one pixel so as to scan next the adjacent strip of image elements 28'. This involves stepwise movement of the upper part 1b of the measuring head 1 and, therefore, suitably a stepper motor will be used. However, the present invention is not restricted to the use of a stepper motor; it is well known from video recorders to scan along a slightly inclined (e.g. vertical) line, while continuously moving in the other (e.g. horizontal direction).

Figure 5:
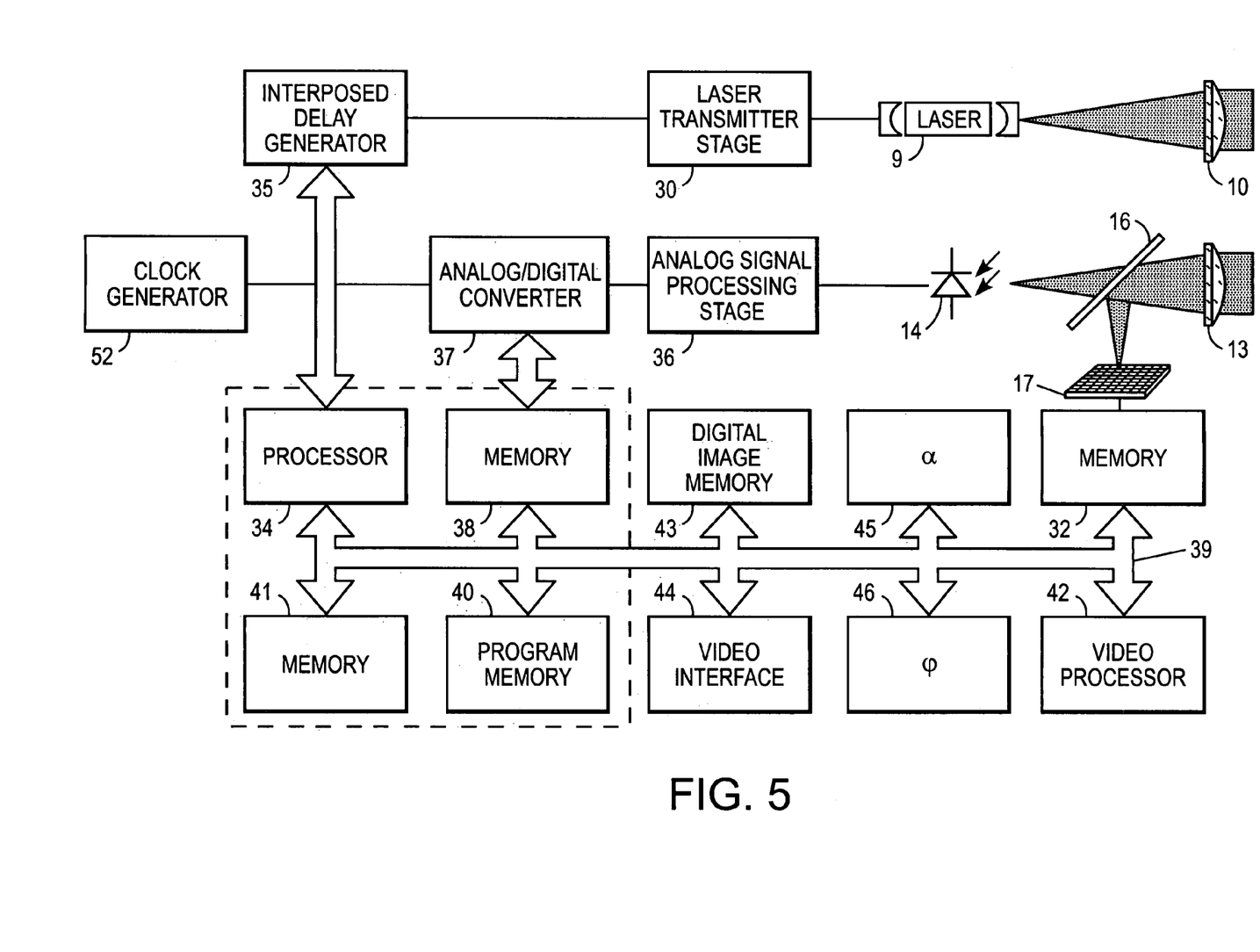
FIG. 5 is a schematic block diagram of an exemplary apparatus according to the invention.
Figure 6:
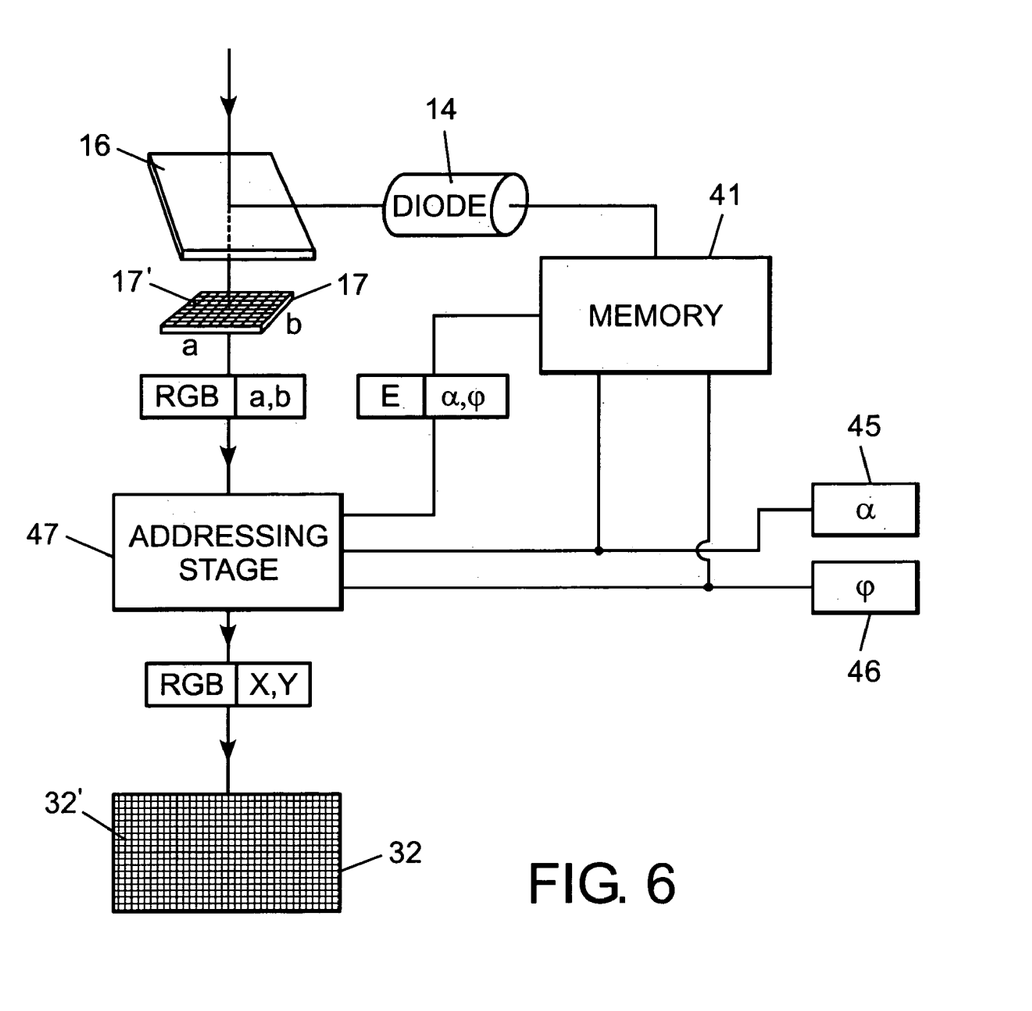
FIG. 6 shows schematically an exemplary procedure of storing and assigning image signals in the memory used in the diagram of FIG. 5.

The center of the array 17 will coincide with the respective position of the laser beam (12a in FIG. 2) of the range finder system and may be defined as the point of origin of the coordinates. Thus, the transducers at the left hand from the center are designated $-a$, while to the right they are designated $+a$. In a vertical direction, the transducers above the center are designated $+b$, while in downward direction they are designated $-b$. The actual position of the laser beam relative to the image field 28 may be determined by image coordinates $x_n$ and $y_m$. As shown in FIG. 5, the array 17 is connected to a first memory 32 which is for memorizing the individual signals from the image elements 28' when gathered by the array 17 during scanning. Therefore, as shown in FIG. 6, the signals of the individual photo-elements or transducers 17' are fed, via an addressing stage 47, into a corresponding pixel memory 32 (also explained below with reference to FIG. 5) which may have about the same configuration as the array 17; e.g., having the same number of memory cells 32' as corresponds to the number of transducers 17' of the array 17. Thus, each image element 28' of the image field 28 will correspond at least to one (or more) cell(s) 32' of the pixel memory 32. Since the array 17 of the embodiment shown comprises two transducers 17' per image element 28' (e.g. for a better resolution), it may be useful to equip the memory 32 with the same number of cells 32'. However, the invention is not restricted to a special configuration of a memory. As will be understood later with reference to FIG. 5, it is possible within the scope of the invention to combine the memory 38 for the data of the range finder system with those of the imaging system. In such a case, it is conceivable that more than one cell of the combined memory is associated to one image element 28'; e.g., one for the image element and one for the associated distance value which two cells have to be read out together when displaying the combined image. More than one cell (e.g. in different memories, but read simultaneously and synchronously) may be used for image information, distance information and, optionally, for additional descriptors of individual vertices of the above-mentioned point cloud ("distance image").

Thus, in the present embodiment, if an array 17 with a matrix of diodes (as transducers) is used, where each individual diode can be directly read out, the image element and its diode(s) in the center of the array 17 (see FIGS. 3 and 6), with respect to the coordinates ($x_n$ and $y_m$), will have the position (0,0) to which corresponds at least one cell 32a having the coordinates ($x_n$ and $y_m$) in the same position (0,0). Accordingly, an image element 28b in position (4, 2) will occupy the corresponding position (4, 2) in cell 32b which has the coordinates ($x_{n+4}$ and $Y_{m-2}$) ($x_{n+ \ldots}$ meaning at right hand of the center and $y_{m- \ldots}$ meaning downwards, while + is upwards).

When the mirror prism 8 rotates to assume the next measuring position, the array 17 is shifted along the line 9 with respect to the image field 28 so that its center (which is at the point of origin of the coordinates) shifts to a position $x_n$ and $y_{m-1}$. Then, the assignment of the transducers 17' to the cells of the memory is shifted by the addressing stage 47 so that the signal of that diode, having now the coordinates (0,+1), takes up that image element 28' which has previously been taken by the transducer 28a when lying at the position of coordinates (0,0), is read again into cell ($x_n$ and $y_m$), because this diode corresponds to the same spatial angle as that of diode (0,0) of the previous measurement and, thus, has the same signal information. Thus, the signals newly read into the memory are added to the previous identical contents of a respective memory cell. If the system is operated with such a system, the memory can be made much smaller so as to include a single (horizontal) line of cells 32'.

The cumulated signal level in one memory cell 32' will then correspond to a multiple of the signal amplitude of an individual diode in correspondence to the number of diodes or transducers 17' of the array 17.

If a CCD array is used, in such devices the charges of the transducers 17' of one line are usually shifted into the next one. This shifting is suitably done synchronously with the rotation of the mirror prism (to which end the angle signals of the angle decoder 11b are used) so that the transducers of the next line (e.g. below the central element 28a) are illuminated under the same spatial angle and the signals of the cells are added within the array itself. As soon as the edge of the array is reached, the added signals of the transducers 17' are read into the corresponding cells 32' of memory 32.

With reference to FIG. 3, still two further alternatives will be described using one-dimensional (linear) arrays or so-called lines. A first variant uses a linear array 17a oriented in a direction X and so that its coordinates, taking a center element 28a' at coordinates ($x_R$ and $y_s$) as the point of origin of the coordinates, vary from −c3 to +c3. In the case of the second variant shown, a linear array 17b is oriented in direction Y reaching from +d4 to −d4, while its center has the coordinates ($x_u$ and $y_v$). Their operation is analogous to that described above. These variants show that, in principle, such linear array may be arranged under any angle desired with respect to the image field 28.

As shown in FIG. 4, the two beams 12a and 12b are a little bit offset in space, while being parallel relative to each other. This spatial distance between the measuring beam 12a and the received beam 12b may lead to a parallax between the distance image taken by receiver 14 and the passive (not actively illuminated) image taken by array 17. This parallax is disturbing in the near distance range, while it may be neglected in the case of objects being far off. Since, however, the assigned distance value is known to the system for every image element 28' (it is, as will be explained with reference to FIG. 5, stored in a memory 38), the addressing stage 47 (FIG. 6), for example, could be used to be connected with memory 38 and to shift reading the array 17 out in dependence of the assigned distance. As will be explained below, pixel memory 32 is only an intermediate memory from which the image will be transferred at the end to a digital image memory 43; thus, it will be possible, as an alternative, to provide such distance dependent shifting for compensating any parallax in the course of transfer of the image from memory 32 to memory 43. Moreover, compensating any parallax could also be done afterwards in the course of a post-processing procedure.

FIG. 4 shows an alternative embodiment of a scanning device in comparison with FIG. 2. Instead of a three-sided mirror prism 8, a four-sided mirror prism 18 is used. In this embodiment, incident light 12b is deviated by a mirror surface 18a to objective lens 13a. This lens focuses the incident light onto a receiver diode 14, preferably an avalanche diode, of the laser range finder. A mirror surface 18b, in contrast, reflects incident light onto an objective lens 16b which, in turn, forms an image of a part of the object space (see the arrays 17, 17a or 17b of FIG. 3 in comparison with the image field 28 of the object space) onto the array 17. The signals thus obtained are memorized in the same way, as has already been described with reference to FIG. 2, optionally embodying the above-mentioned parallax compensation for which purpose the addressing stage 47 can be used which, according to FIG. 6, receives information from the range finder system 41, e.g. either from processor 34 or from memory 38, to compensate for any possible parallax.

FIG. 5 illustrates a schematic block diagram of the control stage 3 of an exemplary laser scanner according to the invention, the diagram showing merely the systems postponed after the scanners (discussed above with reference to FIGS. 2 and 4). A laser transmitter stage 30 controls the laser 9 which has an optical system 10 pre-posed (as shown in FIG. 2) which collimates the laser beam 12a in an optimal manner. Apart from this transmitter optics 10, there is a receiver lens system 13 whose optical axis is parallel to that of the transmitter optics. As before, there is a beam splitter 16 within the path of rays of the optical system 13 of the receiver. The optical system 13 of the receiver concentrates any radiation reflected, generally in a diffuse fashion, from an object being in the path of rays of the transmitter optics 10 onto a receiver diode 14. As has already been mentioned, it is advantageous to use an avalanche diode as the receiver diode 14, although other photo-electric transducers may be used.

Preferably, the transmitting laser 9 and the receiver diode 14 are made compatible as to their spectral characteristics so that the receiver diode 14 has its maximum spectral sensitivity within that range in which the transmitting laser 9 has a maximum emission. Since, however, the receiver diode 14 will receive, apart from the radiation transmitted by the transmitting laser 9 and reflected by an object in the object space, much noise radiation either from daylight and/or from light of some artificial light sources, it may be advantageous to pre-pose an optical filter, which has narrow-band characteristics as good as possible, which provide a maximum transmission within a spectral band in which the wave length of the laser 9 has its maximum.

By the beam splitter 16 part of the light coming from the object space is concentrated onto the array 17 of photo-elements or transducers 17'. As described before, it is preferred to provide the splitter mirror 16 with a dichroic metal coating which permits passing substantially undisturbed the wave length of the laser 9, while the major part of radiation of a shorter wave length, particularly visible light, is reflected to the array 17. As has been mentioned before, the array 17 may comprise triples of photo-elements, instead of normal ones, whose individual photo-elements of each triple have a different spectral sensitivity; e.g., corresponding to the three basic colors, for example. With such an alternative embodiment, a color image of the object field 28 may be taken over the passive (not actively illuminated by a light source incorporated in the apparatus) channel, in parallel to the distance image (the point cloud) of the active channel, instead of a monochromatic image.

The laser transmitter 30 (FIG. 5) comprises an internal pulse generator which controls the laser 9. To this end, the laser transmitter 30 is (preferably indirectly) coupled to a processor 34 which controls it in such a manner that it either transmits a single laser pulse or, as preferred, a sequence of laser pulses, so-called bursts. Such a burst may comprise 1 to 50 pulses depending on the command given by the processor 34. By means of an interposed delay generator 35, the phase of individual pulses of a burst may be shifted, this shifting being done periodically. As to this technique, reference is made to WO 99/13356 the whole contents of which should be considered incorporated herein by reference.

The signals received by diode 14 are amplified and processed in an amplifying and analog signal processing stage 36. In a possible embodiment, the signals processed in this manner are digitized using a sample frequency of, for example, 60 MHz in an analog/digital converter 37. These sampled echo-signals are then stored in memory 38. However, the invention is not restricted to this embodiment, since it would either be possible to digitize the signals before entering a digital processing stage, or to provide fully analog processing and storing.

Due to the above-mentioned phase-shift of the transmitted pulses of a burst with respect to the sample frequency, the sampled echo-signals (reflected from an object in the object space) are stored in different memory cells of memory 38 (which may have the same configuration as memory 32 shown in FIG. 6) If the phase-shift has a periodicity of 5 pulses, as mentioned above, the sampled pulse, after 5 pulses, is added up to the previous one. If a burst comprises 50 pulses and the digitized pulses are "cogged" with a period of 5, in one memory cell 10 digital values are added up and the sample frequency of 60 MHz appears to be increased by the number of periods of "cogging", which is in the present example up to 300 MHz, so that the scanning theorem can be maintained with respect to the re-constructed received pulse.

In an alternative embodiment, the converter 37 is a digitizing stage for digitizing the time intervals of the time-of-flight between a transmitted pulse and the received pulse (after reflection by an object) as well as of the signals of the angle decoders (45, 46 in FIG. 5), and the results are stored in memory 38.

The whole circuitry is clocked by a clock-generator 52. The processor 34 and the data memory 38 are coupled to each other by a data bus 39. Coupled to this data bus are also a program memory 40 for the processor 34 as well as an intermediate data memory 41 in which rough data are stored after the processor has carried out a first evaluation, and which is read out at the end of a measuring cycle. Processor 34, using algorithms stored in program memory 40, determines from these rough data a distance value for each individual image element 28' in a finishing or post-processing procedure. Alternatively, finishing may be done separately; e.g., by inputting a command into computer 5.

Simultaneously with measuring the distance of an object in the object space, the angles α and φ are determined by the angle decoders 45, 46 and will then, together with the distance value, define a vertex of a point cloud. The point cloud embodies the primary initial set of data, while the image information of the passive channel (operated with light from the scene without an active internal light source) and further possible information, such as pulse amplitude, pulse shape and/or pulse width, may be considered as additional descriptors of the individual vertices of the point cloud.

The signals supplied by the individual transducers 17' of the array 17 are read into the image field and pixel memory 32, as has already been described with reference to FIG. 3, the respective image coordinates x and y being made available as the angles α and φ by the electronic decoder units 45 and 46 via data bus 39. The image signal supplied by the pixel memory 32 is further amplified and processed by a video processor 42. This video processor 42 is coupled via bus 39 to processor 34 and the other blocks of the system, particularly with a digital image memory 43 for finishing and a video interface 44. As mentioned above, an alternative is to keep the pixels in the memory 32 and to switch it to digital image memory when ever it is required to finish the image. At least in the first case when doing this, the image coordinates assigned to individual image elements 28' are fed by the electronic units 45 and 46 into the system via data bus 39.

The invention is not restricted to the embodiments described above. For example, as has been indicated above, instead of a digital signal evaluation, an analog signal evaluation can be used; where e.g., for each image element 28' a single laser pulse is employed to determine a distance. Furthermore, instead of the arrays described above having 128×128 transducer elements, or instead of linear arrays 17a, 17b (FIG. 3) having 128 transducer elements, high-resolution two-dimensional or one-dimensional arrays having a line length of >2000 or >4 millions of pixel may be used. For special applications, e.g. for monitoring purposes or for measuring converters of the steel industry, arrays may be used which are particularly sensitive in the infrared range, because infrared is invisible to intruders when monitoring a room or a building, and/or because converters send an infrared radiation themselves when hot (measuring in this application is often done at a temperature of 800° C. to 1200° C.).

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. An apparatus for taking up an object space using an opto-electronic range finder, which measures data of individual distances according to a time-of-flight of signal, the apparatus comprising:

transmitter means for transmitting optical transmitter signals as a beam at a predetermined beam angle along an optical axis; and first receiver means having an optical axis for receiving optical signals reflected from an object situated in said object space after a time-of flight of said transmitter signals and said reflected signals, which have a certain time relationship;

evaluating means comparing said transmitter signals and said reflected signals to determine range values from at least one of said time-of-flight and said time relationship;

second receiver means for receiving electromagnetic radiation to form an image from data of individual image elements, said second receiver means including a predetermined number of transducers as an array to form received signals corresponding to said image elements, and having a predetermined image angle, and including optical means defining an optical axis which adapts said image angle to said beam angle of said transmitter means such that the image angle of an individual transducer of said array corresponds substantially to said beam angle of said transmitter means;

scanning means for deviating a direction of said optical axes of said transmitter means and of said first and second receiver means in two directions and by a certain deviation angle per individual distance measurement to ensure that directions of the optical axes of said first and second receiver means coincide and scan said object space synchronously and in phase;

wherein said second receiver means and said scanning means cooperate to enable determining individual image elements from said image and assigning a spatial angle to each image element, and said array is oriented in correspondence with said two directions of said scanning means;

memory means having a plurality of cells, said plurality of cells assigned each to one of said image elements so that said individual transducers of said array can be read and their received signals can each be stored in a cell of said memory means simultaneously with each one of said individual distance measurements;

an arrangement of said array and said cells of said memory means being such that with each individual distance measurement an assignment of said image elements of said array to said cells of said memory means is shifted by one such that signal received from each respective spatial angle are added up in said individual cells during subsequent measurements.

2. Apparatus as claimed in claim 1, wherein said optical transmitter signals are laser signals.

3. Apparatus as claimed in claim 1, wherein said electromagnetic radiation received by said second receiver means is in a visible range.

4. Apparatus as claimed in claim 1, wherein said deviation angle corresponds to one of said transducers of said second receiver means.

5. Apparatus as claimed in claim 1, wherein said scanning means comprise at least one prism having a plurality of mirror surfaces arranged around an axis of rotation, and drive means for rotating said prism about said axis of rotation.

6. Apparatus as claimed in claim 5, wherein said prism has at least four mirror surfaces.

7. Apparatus as claimed in claim 1, wherein said scanning means comprise a scanner device common to said second receiver, said transmitter means and said first receiver, and comprising optical beam splitting means for splitting off said optical signals reflected from an object, and said electromagnetic radiation.

8. Apparatus as claimed in claim 5, wherein said scanning means comprise a prism having at least four mirror surfaces arranged around an axis of rotation, and drive means for rotating said prism about said axis of rotation, said optical axes being each deviated by different mirror surfaces of said prism.

9. Apparatus as claimed in claim 8, wherein said different mirror surfaces are adjacent each other to form an integral mirror surface.

10. Apparatus as claimed in claim 1, comprising means for changing an assignment of said cells of said memory means to said transducers of said array to avoid a parallax.

11. Apparatus as claimed in claim 1, comprising means for shifting said reflected signals relative to said received signals as a function of said range values determined by said evaluating means to avoid a parallax.

12. Apparatus as claimed in claim 11, comprising means for finishing at least part of said data after first processing, said finishing means comprising said shifting means.

13. Apparatus as claimed in claim 1, wherein said array is linear.

14. Apparatus as claimed in claim 1, wherein said array is two-dimensional and comprises at least two lines of transducers.

15. Apparatus as claimed in claim 14, comprising means for shifting signals stored in the transducers of one line into those of an adjacent line to add shifted signals to signals contained in said adjacent line.

16. Apparatus as claimed in claim 1, comprising addressing means for shifting an assignment of said image elements of said array to said cells of said memory means.

* * * * *

UNITED STATES PATENT AND TRADEMARK OFFICE
CERTIFICATE OF CORRECTION

PATENT NO. : 6,989,890 B2
APPLICATION NO. : 10/287605
DATED : January 4, 2006
INVENTOR(S) : Johannes Riegl et al.

It is certified that error appears in the above-identified patent and that said Letters Patent is hereby corrected as shown below:

Please correct the Assignee name as follows:

(73) Assignee: Riegl Laser Measurement Systems,

GmbH, Horn (AT)

Signed and Sealed this

Fourteenth Day of November, 2006

JON W. DUDAS
*Director of the United States Patent and Trademark Office*

UNITED STATES PATENT AND TRADEMARK OFFICE
CERTIFICATE OF CORRECTION

PATENT NO. : 6,989,890 B2  
APPLICATION NO. : 10/287605  
DATED : January 24, 2006  
INVENTOR(S) : Johannes Riegl et al.

It is certified that error appears in the above-identified patent and that said Letters Patent is hereby corrected as shown below:

Please correct the Assignee name as follows:

(73) Assignee: Riegl Laser Measurement Systems,

GmbH, Horn (AT)

This certificate supersedes Certificate of Correction issued November 14, 2006.

Signed and Sealed this

Second Day of January, 2007

JON W. DUDAS  
*Director of the United States Patent and Trademark Office*